Feb. 11, 1969 R. L. BALLARD ET AL 3,426,435
DIRECT READING TAPE RULE

Filed June 17, 1966 Sheet 1 of 3

INVENTORS
Robert L. Ballard
James E. Edgell
BY
ATTORNEY

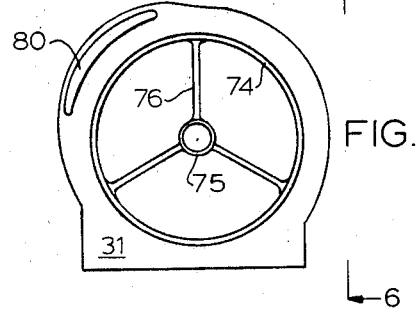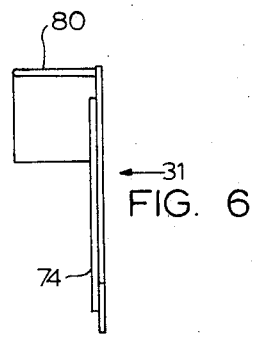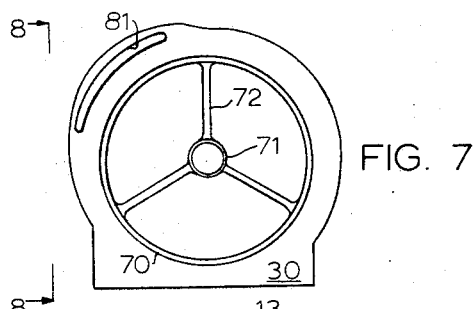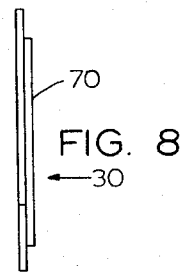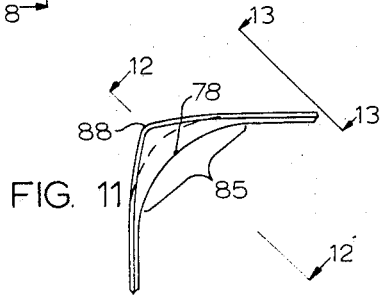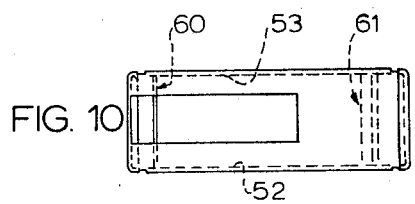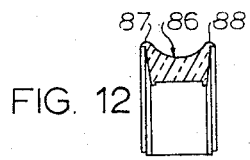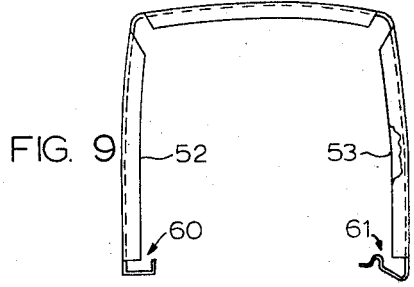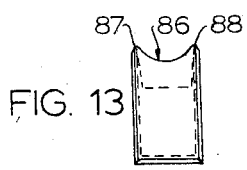

INVENTORS
Robert L. Ballard
James E. Edgell

BY B.B. Olm
ATTORNEY

United States Patent Office 3,426,435
Patented Feb. 11, 1969

3,426,435
DIRECT READING TAPE RULE
Robert L. Ballard, Pittsburgh, and James E. Edgell, Wexford, Pa., assignors to H. K. Porter Company, Inc., (Delaware), Pittsburgh, Pa., a corporation of Delaware
Filed June 17, 1966, Ser. No. 558,411
U.S. Cl. 33—138    9 Claims
Int. Cl. G01b 3/00, 3/10

ABSTRACT OF THE DISCLOSURE

A tape rule incorporates suitable indicia on the back of the tape, a tapered magnifying indexed window in the top front corner of the rule housing, internal tracks and guides which the tape follows and which keeps a portion of the tape pressed against the window and along a path of constant length, flexible side walls and internal tape braking mechanism dependent on flexing of the side walls and arranged such that inside dimensions may be read through the window directly, the tape may be locked against the usual spring tension by allowing the side walls to flex outwardly and released for movement under spring tension by pressing the walls inwardly.

---

This invention is concerned with tape rules and more particularly with tape rules for measuring and reading internal dimensions directly.

When the conventional tape rules are employed for measuring inside dimensions such as between two inside walls, the rear wall of the case is abutted against one of the walls and the zero end of the tape is drawn out and abutted against the other wall. The operator then conventionally takes a reading at the slot in the case where the tape is withdrawn and to this reading adds some amount which is equal to the length of the case in order to obtain the desired distance between the two walls. Because of this mode of operation, it is customary to find on conventional tape rules a notice which, for example, reads "Add 2 Inches for Inside Measure." The operation is inherently time consuming and frequently results in faulty measurements. Direct reading rules have been proposed. See, for example, U.S. Patent 3,004,346. However, prior art direct reading rules have exhibited certain faults as, for example, in the inability of the operator to read the rule without having to be directly over the top of the rule where the "window" is customarily located. The window in the conventional rule is also easily scratched and damaged. Internal tracking of the tape has also prevented certain manufacturing and design problems.

Other characteristics of conventional tape rules which concern the present invention relate to the construction of the housing and internal operating mechanism and particularly the means to brake or hold the withdrawn tape at a particular position. Considering first the matter of housing constructions, it has been almost a universal practice to make the housing from a pair of cast metal half sections which mate and which are usually held together by a plurality of screws and sometimes by rivets. Since the steel tape itself is relatively heavy, the overall construction is relatively heavy and the cast half sections are subject to breakage. Furthermore, considerable time is required to assemble the housing with screws, rivets or the like.

Considering the matter of tape brake mechanisms next, it has long been recognized that carpenters, cabinet makers and other operators of tape rules need some means for holding the tape rule at various withdrawn positions while measurements are being taken or checked or the same measurement transferred to various pieces of material. Various brake mechanisms have been devised, one of the most popular being the push-button type as shown, for example, in U.S. Patent 3,114,515. While such brake mechanisms have given satisfactory performance, the same general construction has been retained, namely, that of employing mating, cast metal, half sections for the housing and screws or other means to hold the half sections together.

In a related copending application entitled "Tape Rule Case and Brake Construction," filed June 29, 1966, Ser. No. 561,567, there is disclosed a type of tape rule which employs a molded housing or case whose side walls are flexible and which when squeezed together operate an internal braking mechanism. The braking mechanism employs a pair of discs which normally press against the edges of the tape. However, when the sides of the housing are squeezed the braking effect of the braking discs is released. Thus, the tape can be easily withdrawn by squeezing the sides, like pressing the bottom of an oil can, or held in a given withdrawn position by allowing the sides to assume their normal curvature. The relation between the present invention and the invention of this copending application is that the present invention retains the advantages of the squeeze case rule but incorporates a modifed structure which allows the user to read inside dimensions directly. Further, the present invention allows the manufacturer to offer a line of both direct reading and non-direct reading rules which incorporate much of the same structure. Much of the disclosure of the referred to copending application is repeated in the present application for the sake of a clear understanding of the present invention and to show how both inventions are related. However, the line of distinction between the two applications should be borne in mind.

An object of the present invention is therefore to provide a tape rule which can be read directly and from remote angled positions when taking inside measurements.

Another object is to provide an improved construction for a direct reading tape rule which is economical to manufacture and in use is not easily subject to damage.

Another object is to provide an improved window for a direct reading type rule which acts to magnify the indicia being read.

Another object is to provide a direct reading tape rule which acts to magnify the indicia being read.

Another object is to provide a direct reading tape rule having a resilient housing such that pressure on the housing members may be employed to control braking of the tape rule when taking inside dimensions.

Another object is to provide a direct reading tape rule case construction which can be assembled without screws or similar fastening means.

Another object is to provide a tape rule construction which can be manufactured either as a direct reading type rule or as an indirect type reading rule.

Another object is to provide a direct reading tape rule having a window for reading inside dimensions directly and which is protected against damage from surface scratching and the like.

Another object is to provide a direct reading tape rule having an improved internal tracking arrangement for the tape.

The foregoing and other objects will become apparent from the description and drawings in which:

FIGURE 5 is an elevation view looking towards the inside surfaces of the right pressure and fence plate.

FIGURE 6 is an elevation view taken in the direction of line 6—6 in FIGURE 5.

FIGURE 7 is an elevation view looking towards the inside surfaces of the left pressure plate.

FIGURE 8 is an elevation view taken along line 8—8 of FIGURE 7.

FIGURE 9 is a side elevation view of the clip which holds the sidecase.

FIGURE 10 is a plan view of the clip.

FIGURE 11 is a side elevation view of the lens member which mounts in the clip.

FIGURE 12 is an elevation view in section taken along line 12—12 of FIGURE 11.

FIGURE 13 is an elevation view taken in the direction of line 13—13 of FIGURE 11.

In the embodiment of the invention which is disclosed in both the copending and present application the recoil spring which can be of the usual construction mounts on a slotted post. This post is formed as an integral part of what is called the sidecase. This entire structure is formed of a suitable flexible plastic. The sidecase forms the bottom wall and the two side walls in the assembled rule. The sidecase is held together by a clip which snaps in place over the sidecase. Of special interest to the present invention, the tape on which the rule indicia appear is printed on both sides. The tape is connected to the recoil spring and the tape is tracked on the inside of the sidecase. The tracking directs the back surface of the tape between a lens member which is mounted in the clip and a fence member which is mounted inside the sidecase. The tracking and the indicia on the back of the tape are arranged so that for inside measurements the inside dimension can be read directly through the lens with reference to the indicia on the back of the tape. Outside measurements are made in the usual way. The referred to lens member resides in the corner rather than in the top of the rule case which allows the user to read inside measurements by looking at the rule from an angle rather than from straight down.

In addition to containing the recoil spring, the tracking arrangement and the recoil spring mounting post, the interior of the rule also contains a pair of what are referred to as a left pressure and a right pressure-fence plate. These pressure plates which are disclosed in the copending application may also be molded of a plastic such as nylon and they mount on the post on opposite sides of the tape such that they can be forced together to engage the edge of the tape and thereby brake the tape at any desired position. When the rule is assembled these pressure plates will assume a position which causes them to assert a braking pressure against the edges of the tape. The sidecase and other members of the rule are so arranged however that this pressure can be released by squeezing the sides of the rule somewhat like pushing in on the bottom of an oil can. Thus, the operator can squeeze the sides of the case to release both the left pressure plate and the right pressure-fence plate and such action will free the tape for easy withdrawal. When the tape has been pulled out to some desired position, the operator can allow the sides to resume their normal position whereupon the tape will be braked and held.

Figure 1:
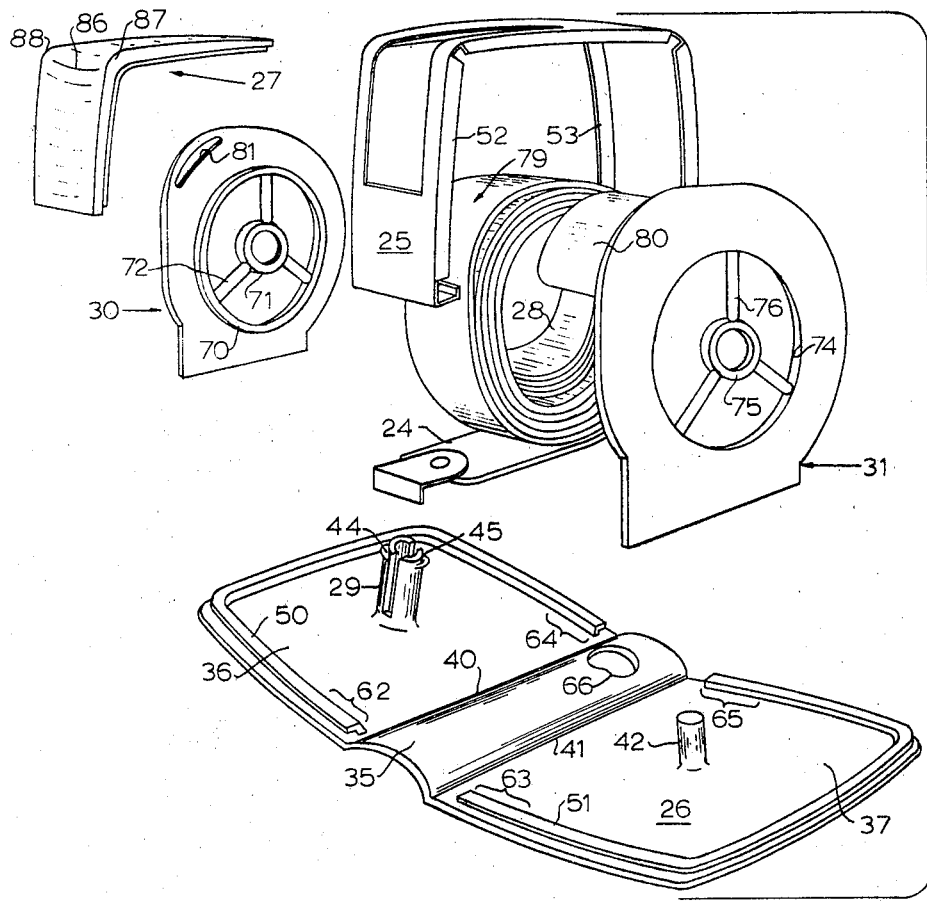
FIGURE 1 is an exploded view of various components of a tape rule embodying the invention and adapted to direct reading for inside measurements.
Figure 3:
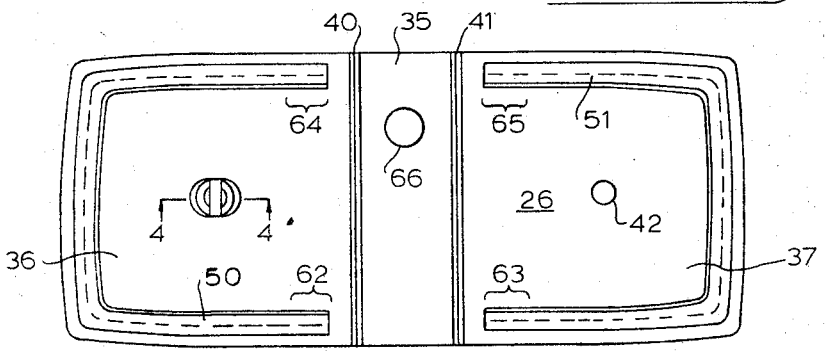
FIGURE 3 is a plan view of the sidecase.
Figure 2:
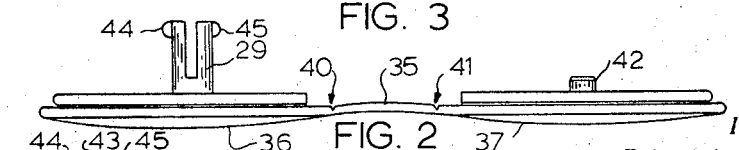
FIGURE 2 is an elevation view of an integral sidecase member which provides the bottom and both side walls of the rule housing.
Figure 4:
FIGURE 4 is a side elevation view of the post which mounts the tape spring and taken along line 4—4 of FIGURE 3.
Figure 14:
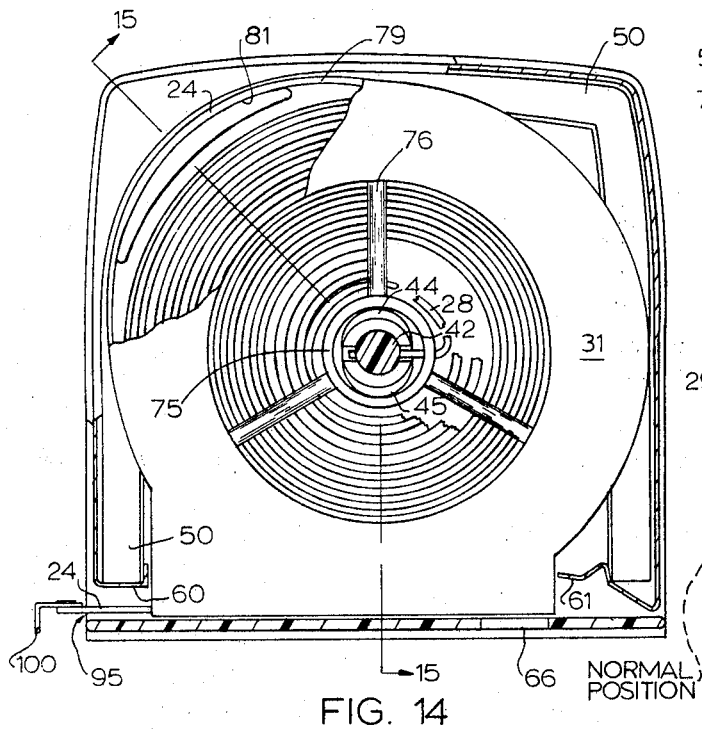
FIGURE 14 is an elevation view of the assembled rule and shown partially in section.

The foregoing is now referred to in more detail in reference to the drawings. What is conventionally regarded as the housing of the rule is made up in the present invention from an assembly of a clip 25 to a sidecase 26. Clip 25 is shown in FIGURE 1 as mounting a lens 27 which as later described is useful in direct reading of inside measurements. A recoil spring 28 which may be of the usual construction is mounted on a post 29 forming an integral part of sidecase 26 and a measuring tape 24 connects to spring 28. A left pressure plate 30 and a right pressure-fence plate 31 mount on post 29 on opposite sides of the tape 24. The described parts, namely, tape 24, clip 25, sidecase 26, lens 27, recoil spring 28 and the pressure plates 30, 31 are all those required to achieve the direct reading advantages of the present invention as well as to retain the advantages of the housing and braking construction taught by the referred to co-pending application. The simplicity of the invention is thus immediately recognized.

Referring next to the details of the principal parts just described, it will be noted that the sidecase 26 includes a bottom wall 35, a left side wall 36 and a right side wall 37. Sidecase 26 is preferably formed of a plastic such as polypropylene or polyethylene which enables walls 35, 36 and 37 to be molded as an integral piece and by utilizing relatively thin lines of juncture as indicated at 40, 41 the bottom wall 35 is effectively hinged to side walls 36 and 37. Such a hinging effect by use of plastic is sometimes referred to in the trade as being a "living hinge." The previously referred to post 29 mounts centrally of left side wall 36 and is hollow so as to receive a mating stud 42 which aligns the two case halves during assembly and prevents the post 29 and particularly the enlargements 44, 45 from collapsing after assembly. It will also be noted that post 29 is provided with a slot 43 which receives the end of the recoil spring 28. As later explained, enlargements 44, 45 retain the pressure plates and limit their travel on post 29.

The left side wall 36 of sidecase 26 is provided with an inverted U-shaped rib 50 and the right side wall 37 is provided with a similar rib 51. It will also be noticed that clip 25 is provided with inverted U-shaped lips 52 and 53, the latter being designed to engage the respective ribs 50, 51 so as to provide a means for holding the side walls 36, 37 in their respective positions. That is, when clip 25 is assembled to sidecase 26, the ribs 50, 51 are brought into locking engagement with the respective lips 52, 53. Clip 25 will also be noted as having a front clip section 60 and a rear clip section 61. In final assembly the front clip section 60 is secured under the bottom and lower portions of the front vertical runs of ribs 50, 51 so as to engage the rib portions indicated at 62, 63. At the same time the rear clip section 61 is snapped in place to engage the bottom and lower portions of the rear vertical runs of ribs 50, 51 so as to engage the rib portions indicated at 64, 65. A hole 66 is provided in the bottom wall 35 to provide a means for disengaging the rear clip section 61 so as to be able to disassemble the rule once it has been assembled. A suitable labelling tape, not shown, may be used to cover hole 66. That is, once clip 25 and sidecase 26 are assembled by means of the lips 52, 53 of clip 25 engaging the ribs 50, 51 of sidecase 26 and the front clip section 60 and rear clip section 61 of clip 25 engaging the respective rib portions 62, 63 and 64, 65 the rule will remain assembled since clip 25 is effectively locked to sidecase 26. However, clip 25 can be quickly disassembled by employing a screwdriver or the like in hole 66 for prying the rear clip section 61 loose from its assembled position.

It will, of course, be understood that the lens 27, recoil spring 28, the tape 24 and the pressure plates 30, 31 are assembled within sidecase 26 before sidecase 26 and clip 25 are snapped together. Considering the left pressure plate 30, it will be noted that plate 30 includes a raised circular rib 70 surrounding a hub 71 supported by spokes 72. The right pressure-fence plate 31 also includes a raised circular rib 74 surrounding a hub 75 supported on spokes 76. In assembly the hub 71 of plate 30 is forced over the enlarged tip of post 29 and is moved to the base of post 29. The assembly of recoil spring 28 and tape 24 is next installed with the end of spring 28 engaging the slot 43 of post 29. The right pressure-fence plate 31 is next installed by forcing hub 75 over the tip of post 29.

Before completing the description of how the various parts are assembled, it will be noted that the right pressure plate 31 includes an integral member 80 which will be referred to as a fence. Fence 80 in the assembled rule is slidably received by a mating slot 81 provided in the left pressure plate 30. It will also be noted that the upper surface of fence 80 is curved to match the curvature of the inside surface of lens 27. The reason for this is that the outside wrap indicated at 79 of tape 24 is guided over fence 80 when the rule is assembled and this forces the backside of tape 24 into sliding contact with the lens 27.

Lens 27 is preferably molded of a high optical quality plastic such as clear, optical quality, polycarbonate and is firmly secured to clip 25 by a suitable adhesive, or by being crush assembled according to well known manufacturing techniques. Lens 27 includes a magnifying section generally extending over the area designated by the numeral 85 which acts to magnify that portion of the indicia printed on the back surface of tape 24 which is read when drawn beneath lens 27. The indicia, of course, increase in number as the tape is withdrawn. A red index line as indicated at 78 is molded across section 85 to provide a measuring reference. The indicia lines immediately below index line 78 are magnified to the greatest extent and less magnification is seen away from line 78. The overall curvature of lens 27 forms a major portion of both the front and top walls and allows observing three whole numbers from any normal observing position. If the reading is between two whole numbers the user can see both such numbers and immediately recognizes the direction in which he should read. It will also be noted that the outside viewing surface indicated at 86 is protected from being scratched or otherwise marred by being disposed between the protective wall portions 87, 88. For example, if the operator accidentally rubs the lens 27 against an abrasive surface the wall portions 87, 88 might be scarred but the viewing surface 86 is protected.

After the right pressure-fence plate 31 has been snapped over the enlarged end of post 29, the sidecase 26 is folded into a U-shape so that stud 42 on wall 37 is aligned with and forced into the hole in post 29. The diameter of stud 42 is such that it prevents post 29 from collapsing once stud 42 has been installed in post 29. That is, the enlarged portions 44, 45 of post 29 are held outwardly which prevents the parts previously installed on post 29 from being released from the post. After the sidecase 26 has been folded and stud 42 installed as described, clip 25 is fitted with its lips 52, 53 and front and rear clip sections 60, 61 engaging ribs 50, 51 as previously discussed in such a manner as to keep the whole assembly locked together and to provide a slot for the tape as indicated at 95.

Figure 15:
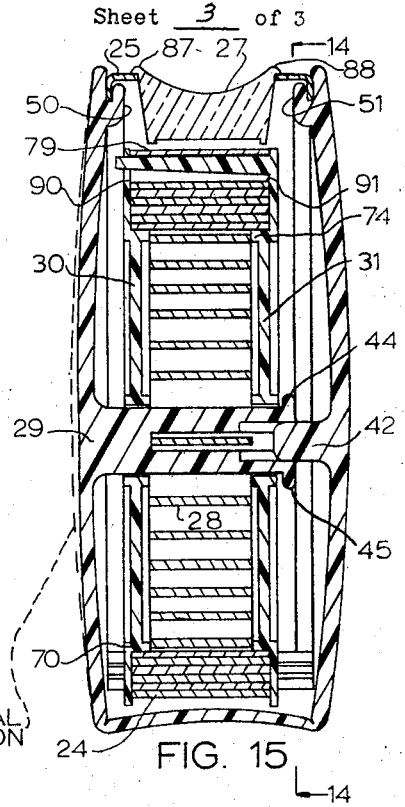
FIGURE 15 is an end elevation view of the assembled rule taken along line 15—15 of FIGURE 14.

In the assembled rule, the pressure plates 30, 31 normally apply pressure to the edges of the tape 24 and this pressure can be released by pressing or squeezing on the walls 36, 37. This action is explained as follows and is believed to be best seen in FIGURE 15. Walls 36 and 37 are seen to be formed so that they bulge outwardly and due to the nature of the plastic material employed they each have a natural spring action very much like the action of the bottom of an oil can. That is, somewhat like the push-button action found, for example, in the referred to Patent 3,114,515 the walls 36, 37 tend to spring back and bulge outwardly whenever they are squeezed and released. Within the assembly, it can also be seen that the edges of the recoil spring 28 will reside against the respective spokes and ribs of the pressure plates 30, 31 and that the tape 24 is coiled around the respective ribs of the pressure plates and has its edges engaging the respective inside surfaces of the pressure plates as indicated, for example, at 90, 91. Thus, when the pressure plates are pushed toward one another a gripping or braking force is asserted on the edges of tape 24 by the pressure plates. Furthermore, fence 80 on the pressure-fence plate 31 is allowed to slide in the slot 81 on pressure plate 30. The length of post 29 is designed so that the tape 24 is normally clamped between the pressure plates 30, 31 and the left pressure plate 30 is held against the rib 50 of the left wall 36 of sidecase 26. When the walls of the sidecase 26 are squeezed together the braking action is released and the pressure plates are given some play or freedom to move on post 29 and fence 80 is allowed to slide outwardly from slot 81. Stated differently the "working length" of post 29 is increased whenever the walls of sidecase 26 are squeezed together and thus the braking action is controlled simply by squeezing and releasing the side walls of sidecase 26. Of special interest to the present invention is that the fence 80 is allowed to slide back and forth in slot 81 and the backside of the tape, i.e., the last overlap 79, is always held against the lens 27.

While not illustrated, it will be understood by those skilled in the art that the location of the index mark 78 on lens 27, the location of the indicia which are printed on the back face of the tape 24 and the tracking distance of the tape clockwise between the index mark 78 and the slot 95 where the tape exits from the sidecase are selected and arranged such that any inside dimension reading which is read at index mark 78 automatically accounts for the width of the rule shown in the drawings as the distance W and eliminates any need for mentally adding such width to get a final reading as in the usual case.

Figure 16:
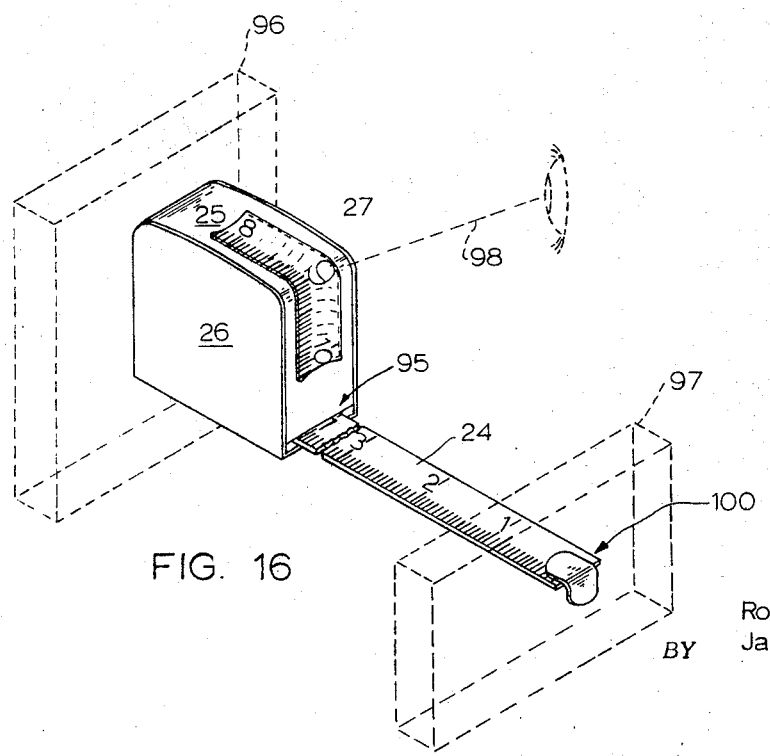
FIGURE 16 is a perspective view showing use of the rule for taking an inside measurement.

FIGURE 16 illustrates how the rule may be employed for taking an inside measurement between two opposing walls 96 and 97, the latter being in dashed lines for purpose of illustration. As shown in this figure the operator abuts the back wall of clip 25 against the wall 96, withdraws the tape until the zero end touches wall 97 and then reads the indicia opposite the index mark 78. Of special interest here is the fact that the operator can read the rule accurately at an angle as illustrated by the angle of the operator's line of sight 98. Thus, since the operator ordinarily has to hold the zero end of the tape in place he can stand near the zero end 100 of the tape and read the inside dimension both directly and accurately. Those skilled in the art will immediately recognize the value of not being required to stand directly over the rule in order to be able to read accurately. That is, the conventional direct reading rule such as that illustrated in U.S. Patent 3,004,346 must be read from a position directly above the top of the rule in order to avoid a parallel error.

Another advantage of the present invention is that the manufacturer is given the choice of being able to manufacture and sell both direct reading and non-direct reading brake type rules with essentially the same components. That is, by eliminating the fence 80 and the lens structure 27 and employing two braking discs like pressure plate 30 and a clip, in place of clip 25, which is like the clip of the co-pending application and which does not provide for a lens, the structure of the present invention for direct reading reverts to the non-direct reading structure of the co-pending application.

As previously described, lens 27 may be molded from a plastic having high optical qualities such as a polycarbonate. Polycarbonates and other plastics having like characteristics are usually rigid and have a high tensile strength. While the clips 25 of this invention are normally made of steel or some other like metal, it is contemplated that lens 27 may be made integral with clip 25 by substituting the plastic from which lens 27 is to be made for the metal in climp 25. Thus, by molding clip 25 and lens 27 integrally and simultaneously, clip 25 and lens 27 become one homogeneous structure. The composite lens and clip structure of this modification is adapted to reduce the cost of manufacture and lend simplicity to the general construction thereof.

In summary, it is seen that the present invention provides a much improved direct reading type structure while retaining all of the advantages of the rule housing and brake structure disclosed in the co-pending application. Further, the rule of the present invention by reason of the angled location and the curved and expansive magnifying area is easier and more convenient to read and gives needed protection to the viewing surface. While shown in conjunction with a housing structure of the type taught by the co-pending application, it is of course contemplated that the direct reading viewing structure is immediately applicable to the usual metal or rigid type housing employed with tape rules.

Having described the invention, what is claimed is:

1. In a flexible tape rule, in combination:
   (a) a case having bottom, top, front, rear and side walls and including a tape slot formed between said front and bottom walls;
   (b) post means fixedly mounted within said case on and extending from one of said side walls;
   (c) a tape retracting spring coiled in some case around said post means and having one end fixed thereto;
   (d) a measuring tape coiled around said spring and having one end connected thereto and the other zero end extending through said slot, said tape having the usual measuring indicia adjusted on the back face for reading inside dimensions directly when viewed in reference to a predetermined index line;
   (e) a window mounted in said case and outwardly curving to form a major portion of both said top and front walls, said line being located on said window and centrally of the corner of said case formed by said window so as to be remotely viewable in front of said corner, the length of said window being sufficient to allow simultaneous viewing of at least three of the whole numbers in said back face indicia, the body of said window being generally thick in the middle portion thereof and tapered at each end and providing an outwardly curved magnification section in said middle portion which decreases in magnification toward said tapered ends, and having integral outwardly extending side portions surrounding and adapted to protect the outer viewing surface of said window; and
   (f) tracking means mounted internally of said case and being adapted to press the outside wrap of said tape for sliding against the inner curved surface of said window and between said index line and slot being adapted to guide said outside wrap along a path of substantially constant length whereby when the said rear wall of said case is abutted against one surface being measured and the zero end of said tape is abutted against another opposite surface being measured the distance between such measured surfaces is obtained directly through said window and with reference to said index line and back face indicia.

2. In a flexible tape rule as claimed in claim 1 wherein said tracking means includes first and second braking plates slidably mounted on said post means on opposite sides of and engaging the edges of said tape, each said plate having circular rib portions adapted to guide said tape and said second plate having an integral fence portion following the curvature of said window and adapted to effect the said pressing of said outer wrap against said window.

3. In a flexible tape rule as claimed in claim 1 wherein said window is molded of optical type plastic.

4. In a flexible tape rule as claimed in claim 2 wherein said first plate includes a slot disposed opposite said fence portion and said fence portion slidably engages said slot, and means to vary the position of said plates on said post means thereby to effect braking and release of said tape, said fence portion being adapted to remain slidably engaged in said slot during varying of said position.

5. In a flexible tape rule as claimed in claim 4 wherein at least one of said side walls comprises an integral resilient wall, said post means is mounted on said resilient wall and said means to vary the position of said plates includes and depends upon movement of said resilient wall.

6. In a flexible tape rule, the combination:
   (a) an integral case member having a bottom wall, resilient side walls having selected edges thereof flexibly and integrally connected to said bottom wall, said side walls adapted to be folded along said selected edges into facing parallel planes;
   (b) an integral clip member providing front, top and rear walls for said case member, said clip member providing front, top and rear walls for said case member, said clip member and said side walls being formed with releasable interengageable connections around the peripheries thereof and being effective to maintain said side walls in said parallel planes, said clip member and said case member forming a slot, said clip member including an integral window outwardly curving in a plane parallel with said side walls to form a major portion of both said top and front walls, said window having an index line located at the junction of said top and front walls so as to be remotely viewable with minimum parallax error when looking from a position in front of said line;
   (c) post means fixedly mounted within said case member on and extending from one of said side walls;
   (d) a tape retracting spring coiled in said case around said post means and having one end fixed thereto;
   (e) a measuring tape coiled around said spring and having one end connected thereto and the other end extending through said slot, said tape having the usual measuring indicia on its front face and on its back face a separate set of indicia adjusted for reading inside dimensions directly when viewed in reference to said line; and
   (f) tracking means mounted internally of said case and being adapted to press the outside wrap of said tape against the inner curved surface of said window and between said index line and slot being adapted to guide said outside wrap along a path of substantially constant length whereby when said rear wall of said case is abutted against one surface being measured and the exposed end of said tape is abutted against another opposite surface being measured the distance between such measured surfaces is obtained directly through said window and with reference to said index line and back face indicia.

7. The flexible tape rule of claim 6 wherein said tracking means includes first and second braking plates slidably mounted on said post means on opposite sides of and engaging the edges of said tape, each said plate having circular rib portions adapted to guide said tape and said second plate having an integral fence portion following the curvature of said window and adapted to effect the said pressing of said outer wrap against said window.

8. The flexible tape rule as claimed in claim 7 wherein said window and clip means are molded from an optical type plastic.

9. In a flexible tape rule as claimed in claim 8 wherein said first plate includes a slot disposed opposite said fence portion and said fence portion slidably engages said slot, and means to vary the position of said plates on said post means thereby to effect braking and release of said tape, said fence portion being adapted to remain slidably engaged in said slot during varying of said position.

References Cited

UNITED STATES PATENTS

| | | | |
|---|---|---|---|
| 3,255,531 | 4/1954 | Anderson | 33—138 |
| 3,004,346 | 10/1961 | Quenot | 33—138 |
| 3,040,698 | 6/1962 | Gray | 116—129 |

FOREIGN PATENTS 943,824   12/1963   Great Britain.

LEONARD FORMAN, *Primary Examiner.*

S. STEPHAN, *Assistant Examiner.*